US011887422B2

(12) United States Patent
Ruth

(10) Patent No.: US 11,887,422 B2
(45) **Date of Patent: *Jan. 30, 2024**

(54) SECURE TRANSPORT CONTAINER

(71) Applicant: Motogo, LLC, Austin, TX (US)

(72) Inventor: David Brian Ruth, Austin, TX (US)

(73) Assignee: Motogo, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/049,015

(22) Filed: Oct. 24, 2022

(65) Prior Publication Data

US 2023/0067784 A1 Mar. 2, 2023

Related U.S. Application Data

(63) Continuation of application No. 17/190,648, filed on Mar. 3, 2021, now Pat. No. 11,508,197, which is a (Continued)

(51) Int. Cl.

*G07C 9/00* (2020.01)
*B65D 55/02* (2006.01)

(Continued)

(52) U.S. Cl.

CPC ......... *G07C 9/00896* (2013.01); *B65D 43/16* (2013.01); *B65D 43/22* (2013.01);

(Continued)

(58) Field of Classification Search

CPC ........ B65D 43/16; B65D 43/22; B65D 55/02; E05G 1/005; G07C 9/00182; G07C 9/00896

(Continued)

(56) References Cited

U.S. PATENT DOCUMENTS 3,718,218 A 2/1973 Shields
4,183,708 A 1/1980 Kuhbier et al.

(Continued)

FOREIGN PATENT DOCUMENTS

DE 102009021529 A1 11/2010
EP 2313321 A1 4/2011

OTHER PUBLICATIONS

Duffy, Jill, "Get Organized: How to Send Gifts and Greeting Cards on Time, Every Time," www.pcmag.com, Apr. 4, 2016, Retrieved from https://www.pcmag.com/how-to/get-organized-how-to-send-gifts-and-greeting-cards-on-time-every-time (Year: 2016).

(Continued)

*Primary Examiner* — Yong Hang Jiang
(74) *Attorney, Agent, or Firm* — Moore Intellectual Property Law, PLLC

(57) ABSTRACT

An apparatus includes a controller configured to initiate attachment of a first locking bar of a transport container to a first anchor point of a structure by adjusting the first locking bar from a first unlocked state to a first locked state. The controller is also configured to confirm a locking of the first locking bar to the first anchor point. The controller is further configured to, in response to confirming the locking, initiate a release of a second locking bar of the transport container from a second anchor point by adjusting the second locking bar from a second locked state to a second unlocked state.

20 Claims, 6 Drawing Sheets

Related U.S. Application Data continuation of application No. 16/261,804, filed on Jan. 30, 2019, now Pat. No. 10,964,143, which is a continuation of application No. 15/680,316, filed on Aug. 18, 2017, now Pat. No. 10,275,966, which is a continuation of application No. 15/498,012, filed on Apr. 26, 2017, now Pat. No. 9,842,449.

(60) Provisional application No. 62/459,276, filed on Feb. 15, 2017, provisional application No. 62/424,253, filed on Nov. 18, 2016.

(51) Int. Cl.
*E05G 1/00* (2006.01)
*B65D 43/16* (2006.01)
*B65D 43/22* (2006.01)

(52) U.S. Cl.
CPC ............. *B65D 55/02* (2013.01); *E05G 1/005* (2013.01); *G07C 9/00182* (2013.01); *G07C 9/0069* (2013.01); *G07C 2009/0092* (2013.01); *G07C 2009/00238* (2013.01); *G07C 2009/00634* (2013.01); *G07C 2009/00642* (2013.01)

(58) Field of Classification Search
USPC ........................................................ 340/5.61
See application file for complete search history.

(56) References Cited

U.S. PATENT DOCUMENTS

| | | | | |
|---|---|---|---|---|
| 6,474,472 | B1 | 11/2002 | Shaw | |
| 6,929,181 | B1 | 8/2005 | Oswalt | |
| 7,191,932 | B2 | 3/2007 | Fobbe et al. | |
| 7,399,148 | B2 | 7/2008 | Bruun | |
| 8,224,664 | B1 | 7/2012 | Louie et al. | |
| 8,888,059 | B2 | 11/2014 | Kohberg et al. | |
| 8,925,683 | B1 * | 1/2015 | Gunsaullus | E06C 1/38 182/129 |
| 9,211,771 | B1 | 12/2015 | Charbonnier | |
| 9,233,634 | B1 * | 1/2016 | Level | B60P 3/077 |
| 9,292,986 | B1 | 3/2016 | Woodward, III et al. | |
| 9,536,216 | B1 | 1/2017 | Lisso | |
| 9,718,611 | B2 | 8/2017 | Gonzalez | |
| 9,842,449 | B1 | 12/2017 | Ruth | |
| 10,514,690 | B1 | 12/2019 | Siegel et al. | |
| 10,789,567 | B1 | 9/2020 | Ur | |
| 10,997,544 | B1 | 5/2021 | Bar-Zeev et al. | |
| 2003/0156010 | A1 * | 8/2003 | Roeland | G07C 9/33 340/5.73 |
| 2004/0133304 | A1 * | 7/2004 | Fobbe | G07C 9/33 700/214 |
| 2005/0046567 | A1 * | 3/2005 | Mortenson | G07C 9/00 340/541 |
| 2006/0101877 | A1 | 5/2006 | Orum et al. | |
| 2008/0061924 | A1 | 3/2008 | Labowicz et al. | |
| 2010/0308604 | A1 * | 12/2010 | Pauken | B60R 7/043 292/169.14 |
| 2010/0312272 | A1 * | 12/2010 | Pavcnik | A61B 17/0057 606/213 |
| 2012/0103031 | A1 | 5/2012 | Grant et al. | |
| 2012/0323645 | A1 | 12/2012 | Spiegel et al. | |
| 2014/0172734 | A1 | 6/2014 | Ginda | |
| 2015/0005733 | A1 * | 1/2015 | Le | A61M 25/02 604/174 |
| 2015/0120597 | A1 | 4/2015 | Dertadian | |
| 2016/0171439 | A1 | 6/2016 | Ladden et al. | |
| 2016/0185466 | A1 | 6/2016 | Dreano | |
| 2016/0232489 | A1 | 8/2016 | Skaaksrud | |
| 2017/0032258 | A1 | 2/2017 | Miresmailli et al. | |
| 2017/0129603 | A1 | 5/2017 | Raptopoulos et al. | |
| 2017/0233155 | A1 | 8/2017 | Daws et al. | |
| 2017/0313421 | A1 | 11/2017 | Gil | |
| 2018/0058739 | A1 | 3/2018 | Zou | |
| 2018/0158018 | A1 | 6/2018 | Luckay et al. | |
| 2018/0186454 | A1 | 7/2018 | Luckay et al. | |
| 2018/0205682 | A1 | 7/2018 | O'Brien et al. | |
| 2018/0300834 | A1 | 10/2018 | High et al. | |
| 2019/0012640 | A1 | 1/2019 | Ferguson et al. | |
| 2019/0028904 | A1 | 1/2019 | Carpenter et al. | |
| 2019/0043001 | A1 | 2/2019 | Woulfe et al. | |
| 2019/0070995 | A1 | 3/2019 | Cantrell et al. | |
| 2019/0122322 | A1 | 4/2019 | Perez | |
| 2019/0130689 | A1 | 5/2019 | Baumgarte et al. | |
| 2019/0196479 | A1 | 6/2019 | Kaneko et al. | |
| 2019/0196511 | A1 | 6/2019 | Millhouse et al. | |
| 2019/0199813 | A1 | 6/2019 | Mohammed | |
| 2019/0220819 | A1 | 7/2019 | Banvait et al. | |
| 2019/0250643 | A1 | 8/2019 | Takizawa | |
| 2020/0128991 | A1 | 4/2020 | Jessie | |

OTHER PUBLICATIONS

Wang et al., "How to Choose "Last Mile" Delivery Modes for E-Fulfillment", Hindawi Publishing Corporation, Mathematical Problems in Engineering, vol. 2014, Jun. 11, 2014, pp. 1-11 (Year: 2014).

* cited by examiner

SECURE TRANSPORT CONTAINER

CROSS REFERENCE TO RELATED APPLICATIONS

This application claims priority from and is a continuation application of pending U.S. patent application Ser. No. 17/190,648, entitled "SECURE TRANSPORT CONTAINER," filed Mar. 3, 2021, which claims priority from and is a continuation application of U.S. patent application Ser. No. 16/261,804, entitled "SECURE TRANSPORT CONTAINER," filed Jan. 30, 2019, issued as U.S. Pat. No. 10,964,143, which claims priority from and is a continuation application of U.S. patent application Ser. No. 15/680,316, entitled "SECURE TRANSPORT CONTAINER," filed Aug. 18, 2017, issued as U.S. Pat. No. 10,275,966, which claims priority from and is a continuation application of U.S. patent application Ser. No. 15/498,012, entitled "SECURE TRANSPORT CONTAINER," filed Apr. 26, 2017, issued as U.S. Pat. No. 9,842,449, which claims priority to U.S. Provisional Application No. 62/459,276, entitled "SECURE TRANSPORT CONTAINER," filed Feb. 15, 2017, and to U.S. Provisional Application No. 62/424,253, entitled "SECURE PARCEL SYSTEM," filed Nov. 18, 2016, all of which are incorporated herein by reference in their entireties.

BACKGROUND

In recent years, consumers have been purchasing more products on-line. Items purchased on-line are often delivered directly to consumers at their residence. When a package is delivered and no one is present to receive it, the package is exposed and vulnerable to theft. Further, when the contents of a package arrive damaged, it is often difficult to ascertain how and when the damage occurred. Damage could have occurred during shipping, for example, due to poor handling. Alternatively or in addition, damage could have occurred after delivery, for example, by someone attempting to steal a package that was left unattended by the recipient's front door.

Current secure package delivery solutions include placing packages within electronic lockers and having recipients retrieve them by inputting a code. These solutions are practical in apartment and condo buildings. However, it is impractical and prohibitively expensive to install electronic lockers for residential homes.

SUMMARY

There is a need for a transport container that provides modular securing functionality that can be easily adapted for delivery at different types of delivery destinations (for example, houses, apartments, condos, buildings, etc.). There is also a need for a transport container that monitors the condition and location of a package while in transit. The present disclosure provides an apparatus, such as a transport container, that is secure and includes electronics to monitor aspects of the transport container's health and location. An apparatus according to the disclosure may include a controller and a memory, the memory storing instructions executable by the controller to initiate or perform operations comprising adjusting a lock between a first state and a second state, the lock configured to, in the first state, secure a cover over an opening of a container body or couple an end of a membrane to a container base, and adjusting a container bar between a locked state and an unlocked state. In an aspect, a transport container may comprise a cover movable from a closed state covering an opening of a body to an open state, a cover lock adjustable from a first unlocked state to a first locked state in which the cover is held in the closed state, a locking bar adjustable from a second unlocked state to a second locked state in which the body is attached to an anchor point, and a controller configured to initiate adjustment of one or both of the cover lock and the locking bar.

Thus, the disclosure provides a transport container that includes a body, a cover, a cover lock, a locking bar, and an electronic controller. The body includes a base, an opening, and at least one side wall. The base, the opening, and the at least one side wall all define a cavity therebetween. The cover is coupled to the body. The cover is movable from a closed state covering the opening to an open state. The cover lock is adjustable between a locked state and an unlocked state. The cover lock is configured to engage the cover and keep the cover in the closed state. The locking bar is coupled to the base. The locking bar is configured for attachment to anchor points. The locking bar is adjustable between the locked state and the unlocked state. The electronic controller is electrically coupled to the cover lock and to the locking bar. The electronic controller is configured to adjust the cover lock between the locked state and the unlocked state. The electronic controller is also configured to adjust the locking bar between the locked state and the unlocked state.

The disclosure also provides a transport container comprising a membrane, the membrane including a membrane end configured to be coupled to a body, a lock coupled to the body and adjustable between first configurations to engage the membrane end and not engage the membrane end, and a locking bar adjustable between second configurations to either couple the body to an anchor point or not couple the body to the anchor point. The lock and the locking bar are adjustable together, or are independently adjustable, between locked and unlocked states. The disclosure also provides a transport container that includes a base, a membrane, a membrane lock, a locking bar, and an electronic controller. The membrane includes a first end and a second end. The first end of the membrane and the second end of membrane are coupled to the base. The membrane lock is adjustable between a locked state and an unlocked state. The membrane lock is configured to engage the second end of the membrane while in the locked state. The locking bar is coupled to the base. The locking bar is configured for attachment to anchor points. The locking bar is adjustable between the locked state and the unlocked state. The electronic controller is disposed within the base. The electronic controller is electrically coupled to the membrane lock and to the locking bar. The electronic controller is configured to adjust the membrane lock from the unlocked state to the locked state. The electronic controller is also configured to adjust the membrane lock from the locked state to the unlocked state in response to receiving an unlock code. The electronic controller is further configured to adjust the locking bar between the locked state and the unlocked state.

Other aspects of the disclosure will become apparent by consideration of the detailed description and accompanying drawings.

DETAILED DESCRIPTION

For ease of description, each of the exemplary systems presented herein is illustrated with a single exemplar of each of its component parts. Some examples may not describe or illustrate all components of the systems. Other exemplary embodiments may include more or fewer of each of the illustrated components, may combine some components, or may include additional or alternative components.

Figure 1:
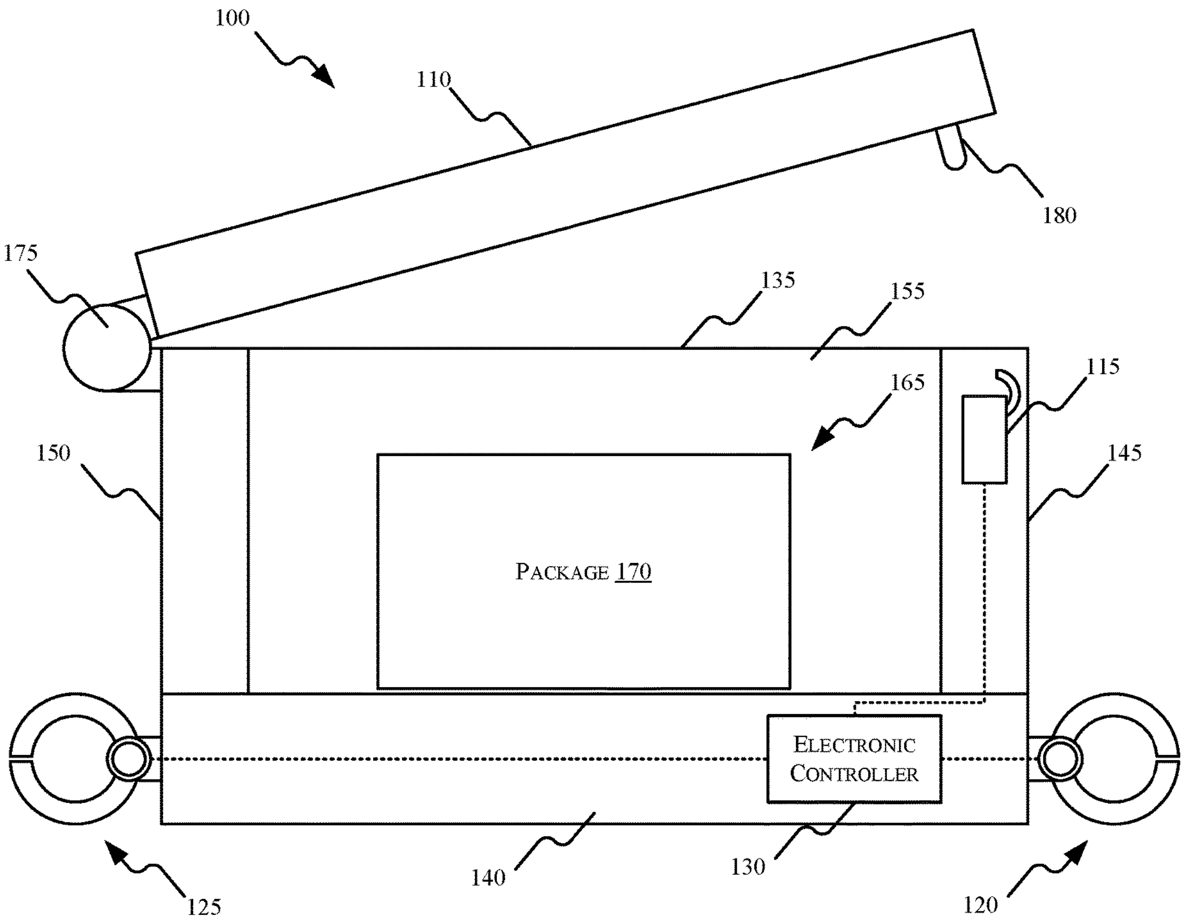
FIG. 1 is a diagram of a transport container in an open state, in accordance with some embodiments.
Figure 2:
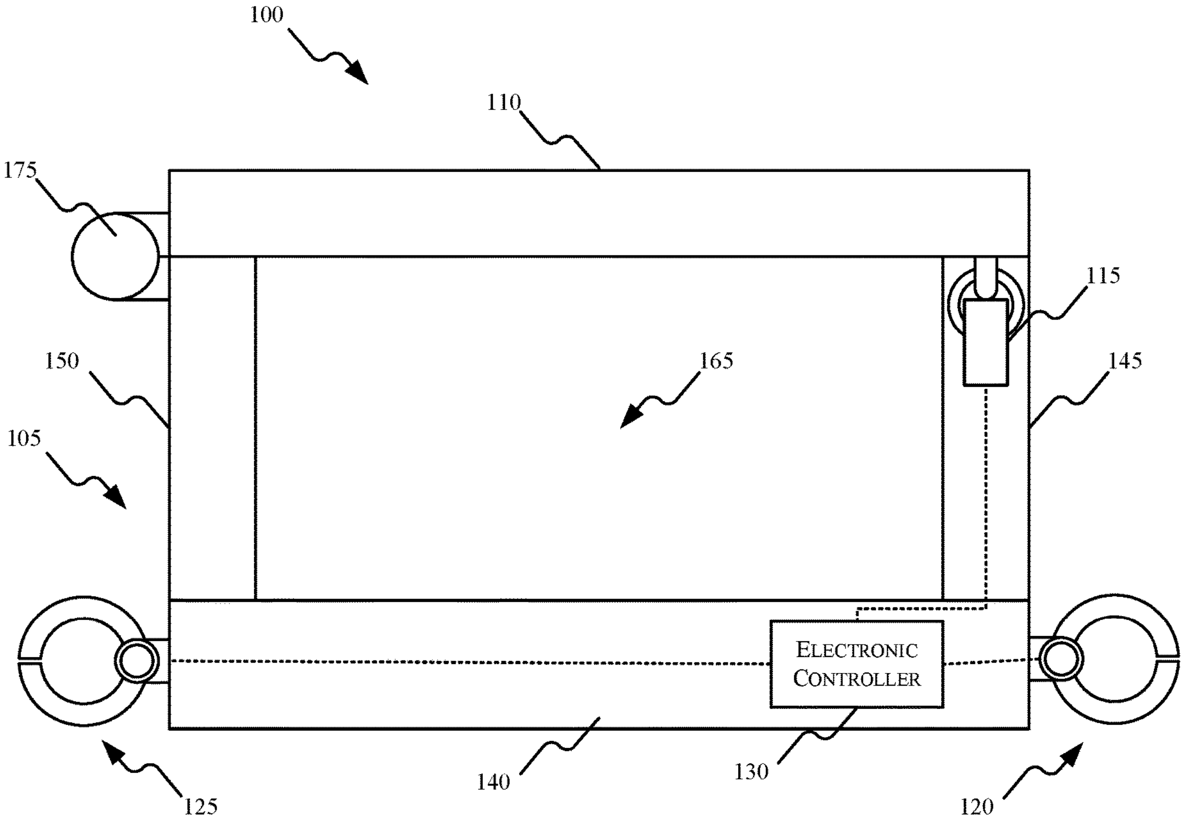
FIG. 2 is a diagram of the transport container of FIG. 1 in a closed state.

FIG. 1 is a diagram of one exemplary embodiment of a transport container 100 in an open state. FIG. 2 illustrates the transport container 100 in a closed state. The transport container 100 illustrated in FIGS. 1 and 2 includes a body 105, a cover 110, a cover lock 115, a first locking bar 120, a second locking bar 125, and an electronic controller 130. The transport container 100 described herein may include fewer, additional, or different components in different configurations than the transport container 100 illustrated in FIGS. 1 and 2. For example, in some embodiments, the transport container 100 includes only one locking bar.

The body 105 is generally box-shaped. The body 105 includes, among other things, an opening 135, a base 140, a front 145, a back 150, a first side 155, and a second side 160 (illustrated in FIG. 3). The second side 160 is opposite from the first side 155. The opening 135, the base 140, the front 145, the back 150, the first side 155, and the second side 160 define a cavity 165. The cavity 165 holds the item or items being transported. As an illustrative example, a package 170 is placed within the cavity 165 in FIG. 1. In alternate embodiments, the body 105 may have a generally cylindrical shape (not shown) defined by an opening, a base, and at least one side wall defining a cavity therebetween and coverable with a cover. Other configurations of the body 105 are also suitable so long as they define a cavity for placement of packages, parcels, and other items.

In the embodiment illustrated in FIGS. 1 and 2, the cover 110 is pivotably coupled to the body 105 via one or more hinges 175. In other embodiments, the cover 110 is coupled to the body 105 via other types of connectors (for example, sliding connectors). In an open state (illustrated in FIG. 1), the cover 110 is positioned away from opening 135 such that the cavity 165 is exposed and the contents within the cavity 165 are accessible. In a closed state (illustrated in FIG. 2), the cover 110 is positioned adjacent to the opening 135 such that the cavity 165 is secured and the contents within the cavity 165 are not accessible.

The cover lock 115 includes an unlocked state (illustrated FIG. 1) and a locked state (illustrated in FIG. 2). When the cover 110 is in the closed state and the cover lock 115 is in the locked state, as illustrated in FIG. 2, the cover lock 115 engages a hook 180 included in the cover 110 to prevent the cover 110 from changing to the open state. Alternatively, when the cover lock 115 is in the unlocked state, the cover 110 may freely move between the closed state and the open state. The cover lock 115 is electrically coupled to the electronic controller 130. The electronic controller 130 adjusts the cover lock 115 between the locked and unlocked states by generating and sending control signals to the cover lock 115.

Figure 3A:
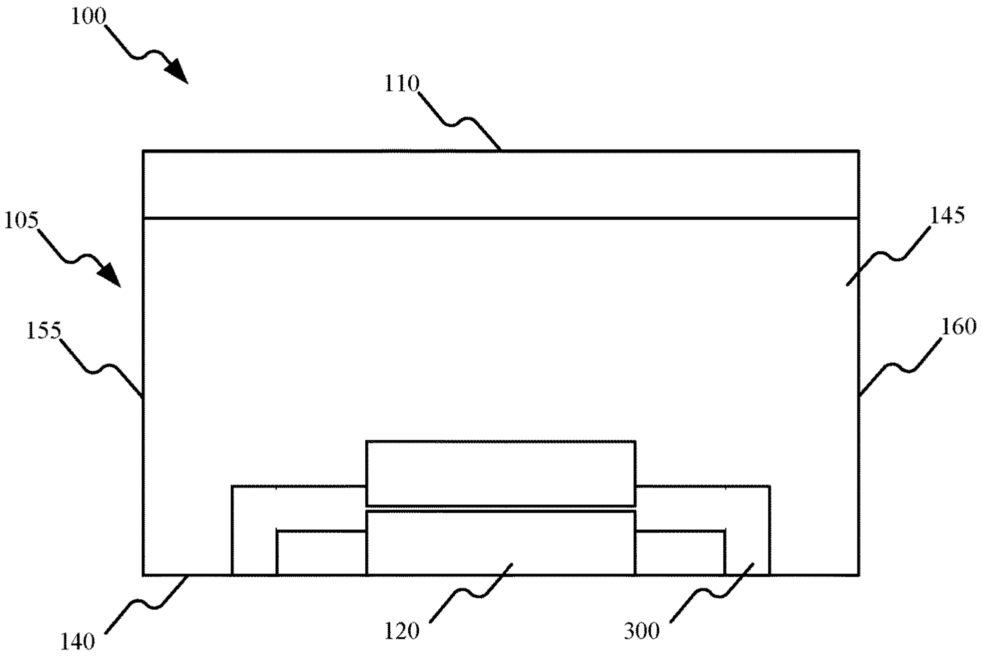
FIG. 3A is a front view of the transport container of FIG. 1, attached to an anchor point.
Figure 3B:
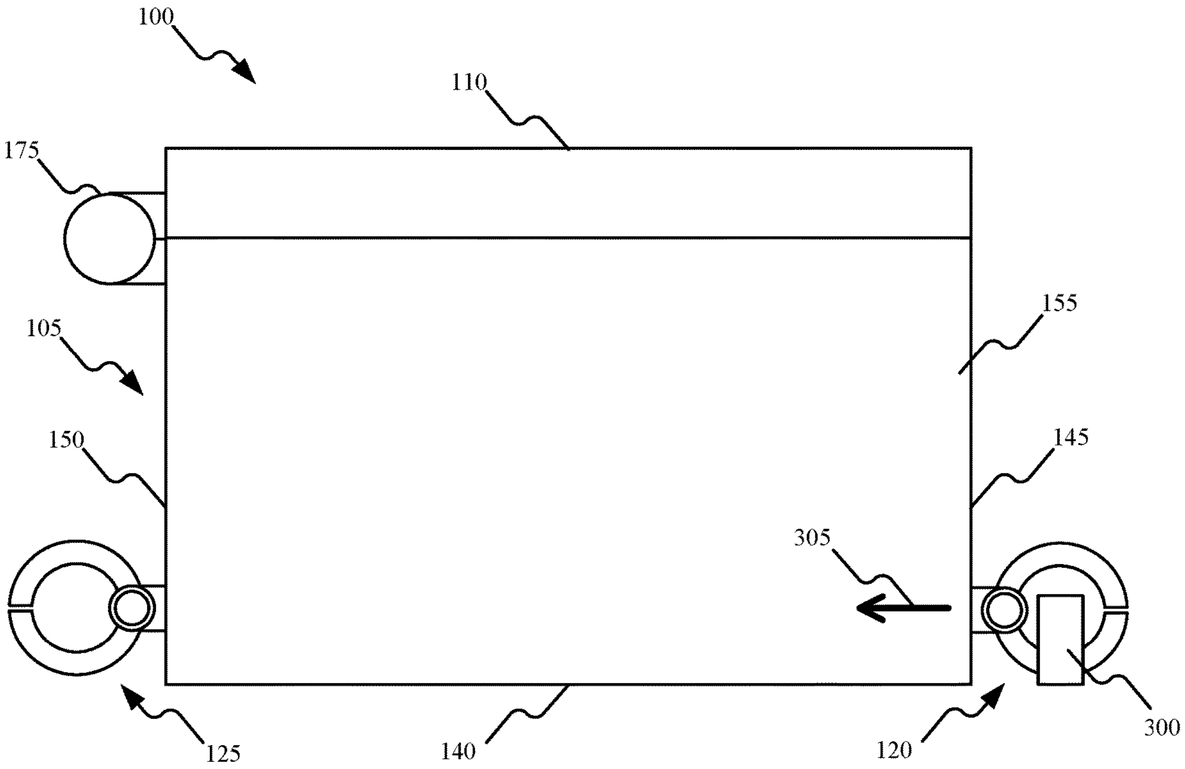
FIG. 3B is a side view of the transport container of FIG. 1, attached to an anchor point.

Upon being delivered to its destination, the transport container 100 is securely attached to a fixed anchor point via one or more securing mechanisms included in the transport container 100. In the embodiments, the securing mechanism includes the first locking bar 120 and the second locking bar 125, as illustrated in FIGS. 1 and 2. In some embodiments, the fixed anchor point is a bar 300 (illustrated in FIGS. 3A and 3B). The bar 300 may be attached, for example, to a spot on the ground outside the house of the recipient of the transport container 100. As illustrated in FIGS. 3A and 3B, the first locking bar 120 is securely attached to the bar 300. Thus, the transport container 100 is securely attached to the fixed anchor point. The transport container 100 remains securely attached to the fixed anchor point until the recipient of the transport container 100 retrieves the contents placed within the cavity 165 of the transport container 100, as described in further detail below. After the contents have been retrieved by the recipient, the transport container 100 can be retrieved by an authorized party (for example, a delivery person of a shipping company).

The transport container 100 can also be securely attached to anchor points at other locations. For example, the transport container 100 can be securely attached to an anchor point located near the location of the sender of the transport container 100. As a further example, the transport container 100 can be securely attached to several different anchor points as it travels from the sender to the recipient (for example, anchors points in delivery vehicles, sorting facilities, etc.).

In some embodiments, the transport container 100 includes a single securing mechanism (for example, the first locking bar 120). In alternate embodiments, the transport container 100 includes more than one securing mechanism (for example, the first locking bar 120 and the second locking bar 125). As illustrated in FIG. 3B, the first locking bar 120 is coupled to the front 145 of the transport container 100 and the second locking bar 125 is coupled to the back 150 of the transport container 100. As explained in more detail below, placing locking bars on opposite sides of the transport container 100 enables a secure package transfer transition from a delivery unit to either the next deliver unit or to an anchored delivery point.

The first locking bar 120, the second locking bar 125, and the anchor points described above and illustrated in FIGS. 1, 2, 3A, and 3B are only one exemplary embodiment of a securing mechanism. The locking bars and anchor points can include any appropriate form of complementary locking structures (for example, clamps, hooks, levers, etc.). In addition, in some embodiments, the transport container 100 is securely attached to an anchor point via a magnet lock.

Figure 4:
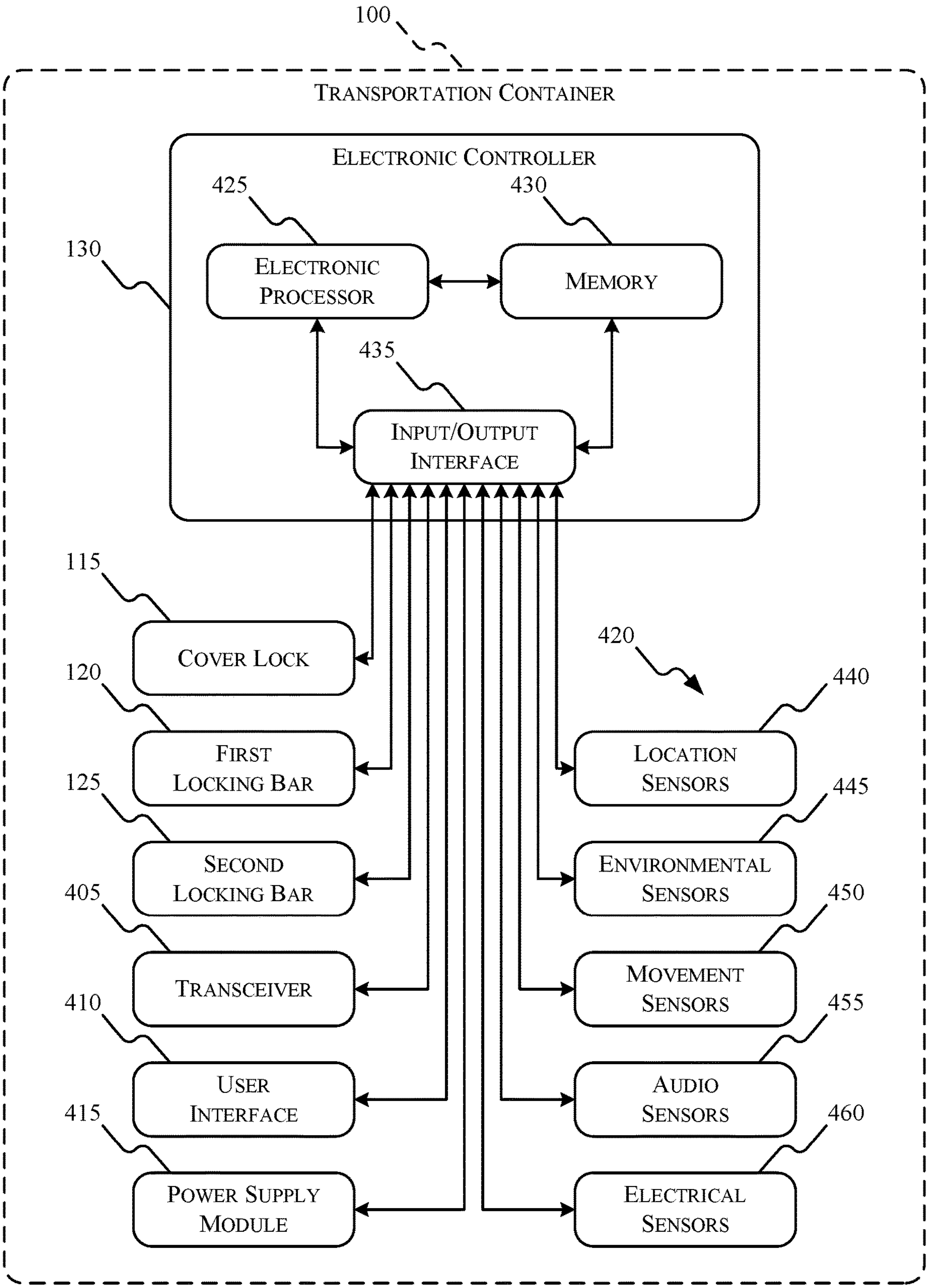
FIG. 4 is a block diagram of the electronics included in the transport container of FIG. 1, in accordance with some embodiments.

FIG. 4 is a diagram of one exemplary embodiment of the components included in the transport container 100. In the embodiment illustrated, the transport container 100 includes the cover lock 115, the first locking bar 120, the second locking bar 125, the electronic controller 130, a transceiver 405, a user interface 410, a power supply module 415, and a plurality of sensors 420.

The electronic controller 130 includes, among other things, an electronic processor 425 (for example, a microprocessor), memory 430, an input/output interface 435, and a bus. The bus connects various components of the electronic controller 130 including the memory 430 to the electronic processor 425. The memory 430 includes read only memory (ROM), random access memory (RAM), an electrically erasable programmable read-only memory (EEPROM), other non-transitory computer-readable media, or any combination thereof. The electronic processor 425 is configured to retrieve program instructions and data from the memory 430 and execute, among other things, instructions to perform the methods described herein. Additionally or alternatively, the memory 430 is included in the electronic processor 425. The input/output interface 435 includes routines for transferring information between components within the electronic controller 130 and other components internal and external to the transport container 100.

The transceiver 405 is configured to provide communications between the transport container 100 and one or more additional transport containers or other components within a transport system (for example, delivery vehicles, sorting facilities, etc.). The transceiver 405 transmits signals to one or more communication networks and receives signals from the communication networks. In some embodiments, signals include, for example, data, data packets, or any combination thereof. In some embodiments, the transceiver 405 includes separate transmitters and receivers. The communication network may be implemented using various networks, for example, a cellular network, the Internet, a Bluetooth™ network, a wireless local area network (for example, Wi-Fi), a wireless accessory Personal Area Networks (PAN), cable, an Ethernet network, satellite, a machine-to-machine (M2M) autonomous network, and a public switched telephone network.

The user interface 410 is included to control the transport container 100. The user interface 410 is operably coupled to the electronic controller 130 to control, for example, the states of the cover lock 115, the first locking bar 120, and the second locking bar 125. In some embodiments, the electronic controller 130 receives an unlock code from a user via the user interface 410 and changes the state of the cover lock 115, the first locking bar 120, or the second locking bar 125. For example, the electronic controller 130 changes the cover lock 115 from the locked state to the unlocked state in response to receiving an unlock code from the recipient via the user interface 410. Alternatively or in addition, the electronic controller 130 unlocks the cover lock 115 in response to a biometric validation performed by the user interface 410. For example, the electronic controller 130 validates a fingerprint obtained by the user interface 410.

The user interface 410 can include any combination of digital and analog input devices required to achieve a desired level of control for the transport container 100. For example, the user interface 410 can include a display, a camera, a speaker, a fingerprint sensor, a plurality of knobs, dials, switches, buttons, and the like. In some embodiments, the user interface 410 includes a touch-sensitive interface (for example, a touch-screen display) that displays visual output generated by software applications executed by the electronic processor 425. Visual output includes, for example, graphical indicators, lights, colors, text, images, graphical user interfaces (GUIs), combinations of the foregoing, and the like. The touch-sensitive interface includes a suitable display mechanism for displaying the visual output (for example, a light-emitting diode (LED) screen, a liquid crystal display (LCD) screen, and the like). The touch-sensitive interface also receives user input using detected physical contact (for example, detected capacitance or resistance). Based on the user input, the touch-sensitive interface outputs signals to the electronic processor 425 which indicate positions on the touch-sensitive interface currently being selected by physical contact.

The power supply module 415 supplies a nominal AC or DC voltage to the transport container 100. In some embodiments, the power supply module 415 is powered by one or more batteries or battery packs including in the transport container 100. The power supply module 415 is also configured to supply lower voltages to operate circuits and components within the transport container 100. In some embodiments, the power supply module 415 is powered by a power supply having nominal line voltages between, for example, 100 volts AC and 240 volts AC and frequencies of approximately 50 hertz to 60 hertz.

The plurality of sensors 420 include various sensors configured to detect various conditions of the transport container 100. In some embodiments, the plurality of sensors 420 include location sensors 440, environmental sensors 445, movement sensors 450, audio sensors 455, electrical sensors 460, or any combination thereof.

Location sensors 440 (for example, global positioning system (GPS) sensors) are used to determine an absolute or relative location of the transport container 100. As explained above, the transport container 100 is secured to an anchoring point upon being delivered. In some embodiments, the electronic controller 130 ensures that the transport container 100 has been delivered to the correct anchoring point by comparing the current location of the transport container 100 (determined using the location sensors 440) to a location of a target anchor point. In some embodiments, the location sensors 440 determine the location of the transport container 100 periodically.

Alternatively and in addition, the location sensors 440 determine the location of the transport container 100 in response to receiving a request (for example, via the transceiver 405). For example, the recipient or sender of the transport container 100 sends a request signal to the electronic controller 130, via the transceiver 405, requesting a location of the transport container 100. In response, the electronic controller 130 determines a current (or last known) location of the transport container 100, via the location sensors 440, and transmits the location to the recipient or sender, via the transceiver 405. In some embodiments, the electronic controller 130 determines the location of the transport container 100 based at least in part on one or more location signals received via the transceiver 405.

Environmental sensors 445 (for example, temperature sensors and humidity sensors) are used to determine the environmental conditions of the transport container 100. For example, the environmental sensors 445 may be placed within the cavity 165 of the transport container 100 and configured to determine the temperature and humidity. In some embodiments, the electronic controller 130 determines whether predetermined environmental conditions exist within the transport container 100. For example, when the transport container 100 is transported with an item that requires a temperature below a set threshold, the electronic controller 130 continuously determines the temperature within the transport container 100, via the environmental sensors 445, and transmits an alert signal when the temperature rises above the set threshold.

Movement sensors 450 (for example, an accelerometer, gyroscope, or a magnetometer) are used to detect movement of the transport container 100. The ability to detect movement of the transport container 100 provides a plurality of benefits. For example, while a normal level of movement is to be expected while the transport container 100 is being transported, an excessive amount of movement (for example, movement caused by the transport container 100 being dropped) may indicate mishandling. In some embodiments, the electronic controller 130 uses the movement sensors 450 to detect when the amount of movement is above a set threshold and transmits an alert signal to, for example, the sender, the recipient, the shipping company, or any combination thereof. The alerts signal may be used to determine the cause of damaged packages.

Another benefit of movement sensors 450 is added security. For example, after being secured to an anchoring point the transport container 100 should not be moving until the recipient retrieves the packages. Movement of the transport container 100 after being secured to an anchor point and prior to being retrieved by the recipient could indicate a potential theft attempt. Thus, in some embodiments, the electronic controller 130 detects such improper movement of the transport container 100 and transmits an alert signal to, for example, the sender, the recipient, the shipping company, or any combination thereof.

Audio sensors 455 (for example, a microphone) are used to record noise present around the transport container 100. For example, the audio sensors 455 can record audio during a potential theft of the transport container 100 while it is secured to an anchor point. The recorded audio can later be used to determine the identity of the party attempting to steal the transport container 100.

In some embodiments, the electronic controller 130 confirms a locking acknowledgement with an anchor point via a tug test after attempting to secure the first locking bar 120 or the second locking bar 125 to the anchor point. A tug test includes a physical pulling force being exerted on the first locking bar 120 (or the second locking bar 125) after it is secured to an anchor point. For example, as illustrated in FIG. 3B, the transport container 100 is tugged (or pulled) in the direction of arrow 305 to confirm that the transport container 100 is secured to the bar 300 via the first locking bar 120.

In some embodiments, the tug test is performed by an autonomous delivery robot (or a delivery vehicle) (not shown) to confirm a locking acknowledgement of the first locking bar 120 (or the second locking bar 125) to an anchor point. In such embodiments, the electronic controller 130 in the transport container 100 transmits a signal (for example, via the transceiver 405) to the autonomous delivery robot after attempting to secure the transport container 100 to an anchor point via the first locking bar 120 (or the second locking bar 125). Responsive to receiving the signal, the autonomous delivery robot tugs on the transport container 100. For example, the autonomous delivery robot pulls the transport container 100 in the direction of arrow 305 to confirm that the transport container 100 is securely coupled to the bar 300 via the first locking bar 120, as illustrated in FIG. 3B. In some embodiments, the electronic controller 130 measures a movement of the transport container 100 caused by the tugging (for example, via the movement sensors 450) and confirms a locking acknowledgement to an anchor point based on the detected movement. For example, the electronic controller 130 confirms a locking acknowledgement when the detected movement is less than a threshold. In other embodiments, movement of the transport container 100 is detected by an external electronic device (for example, by the autonomous delivery robot) and the electronic controller 130 receives a signal from the external electronic device to confirm a locking acknowledgement.

Alternatively or in addition, the transport container 100 performs the tug test itself. In such embodiments, the transport container 100 further includes electronic actuators (not shown) that pull the first locking bar 120 and the second locking bar 125 toward the base 140 of the transport container 100. For example, after securing the first locking bar 120 to an anchor point, the electronic controller 130 activates an electronic actuator that pulls the first locking bar 120 toward the base 140 of the transport container 100.

In some embodiments, the electronic controller 130 is configured to confirm a locking acknowledgement with a new anchor point before allowing a release from a previous anchor point. For example, the electronic controller 130 ensures that the first locking bar 120 is securely attached to a first anchor point by confirming a locking acknowledgement of the first locking bar 120 to the first anchor point before releasing the second locking bar 125 from a second anchor point (for example, a second anchor point in a delivery vehicle or autonomous delivery robot).

Figure 5:
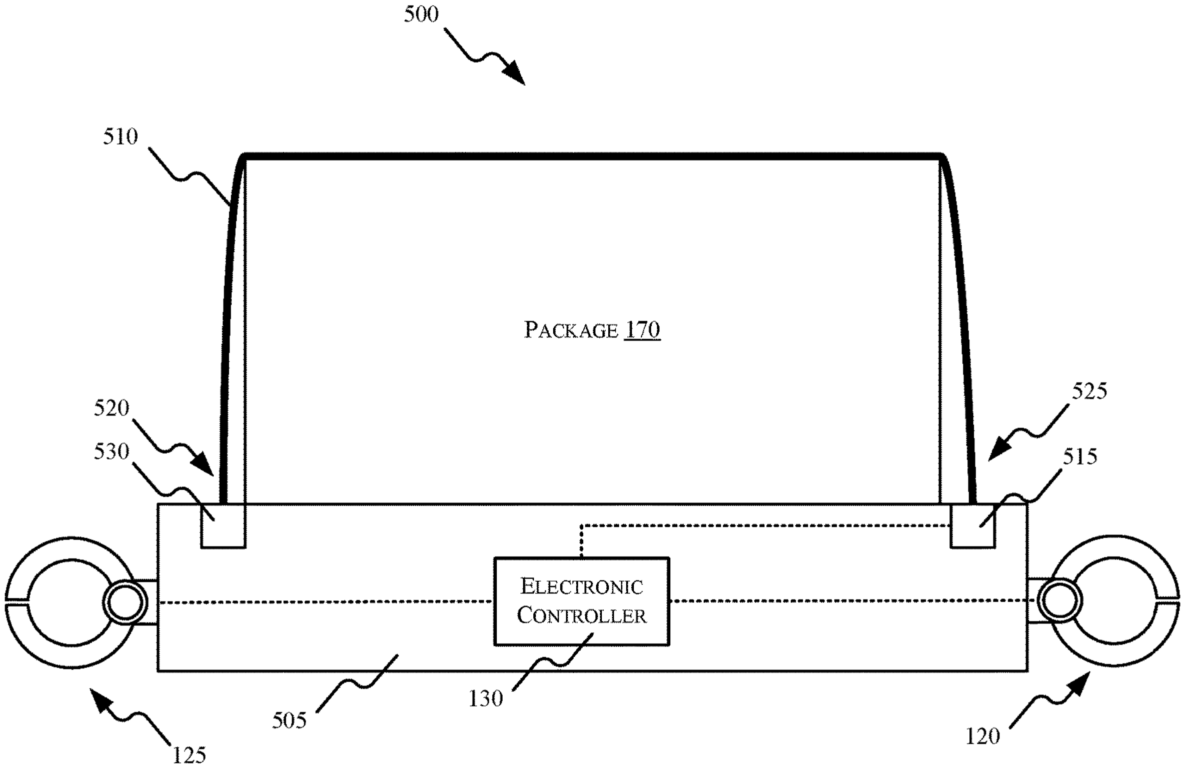
FIG. 5 is a diagram of a transport container, in accordance with some embodiments.

The transport container 100 illustrated in FIGS. 1, 2, 3A, and 3B is provided as one example of such a container. FIG. 5 is a diagram of another exemplary embodiment of a transport container 500. The transport container 500 illustrated in FIG. 5 includes a base 505, a membrane 510, a membrane lock 515, the first locking bar 120, the second locking bar 125, and the electronic controller 130. Unlike the transport container 100 which has fixed sides, transport container 500 includes the membrane 510 which secures the package 170 to the base 505. The membrane 510 pulls out of the base 505 and folds over the package 170 and then locks back onto the base 505 using the membrane lock 515. A first end 520 of the membrane 510 is coupled to the base 505. A second end 525 of the membrane 510 is releasable coupled to the base 505 via the membrane lock 515.

In some embodiments, the membrane 510 includes an electrical conducting material that allows for electrical sensing of the membrane 510 to detect when the membrane 510 is broken and/or compromised. In some embodiments, the electronic controller 130 continuously or periodically transmits a current through the membrane 510 and determines capacitance measurements via the electrical sensors 460. A change in detected capacitance may indicate that the membrane 510 has been broken and/or compromised. In some embodiments, upon detecting such a change in capacitance, the electronic controller 130 transmits an alert signal to, for example, the sender, the recipient, the shipping company, or any combination thereof. In other embodiments, the electronic controller 130 identifies tampering of the membrane 510 by detecting changes in a different electrical property of the membrane 510 such as resistance, inductance, or continuity.

In the embodiment illustrated in FIG. 5, the transport container 500 includes a locking mechanism 530 that self-tightens the membrane 510 around the package 170 (similar to a self-tightening seatbelt in a passenger vehicle). In some embodiments, the locking mechanism 530 includes a locking gear and an actuator (not shown) that pull the membrane 510 toward the base 140 to hold the membrane 510 firmly against the package 170. In some embodiments, the locking mechanism 530 is positioned within the base 505, as illustrated in FIG. 5. In other embodiments, the locking mechanism 530 is positioned on the base 505 (for example, on a side of the base 505 that the package 170 is also positioned on).

Figure 6:
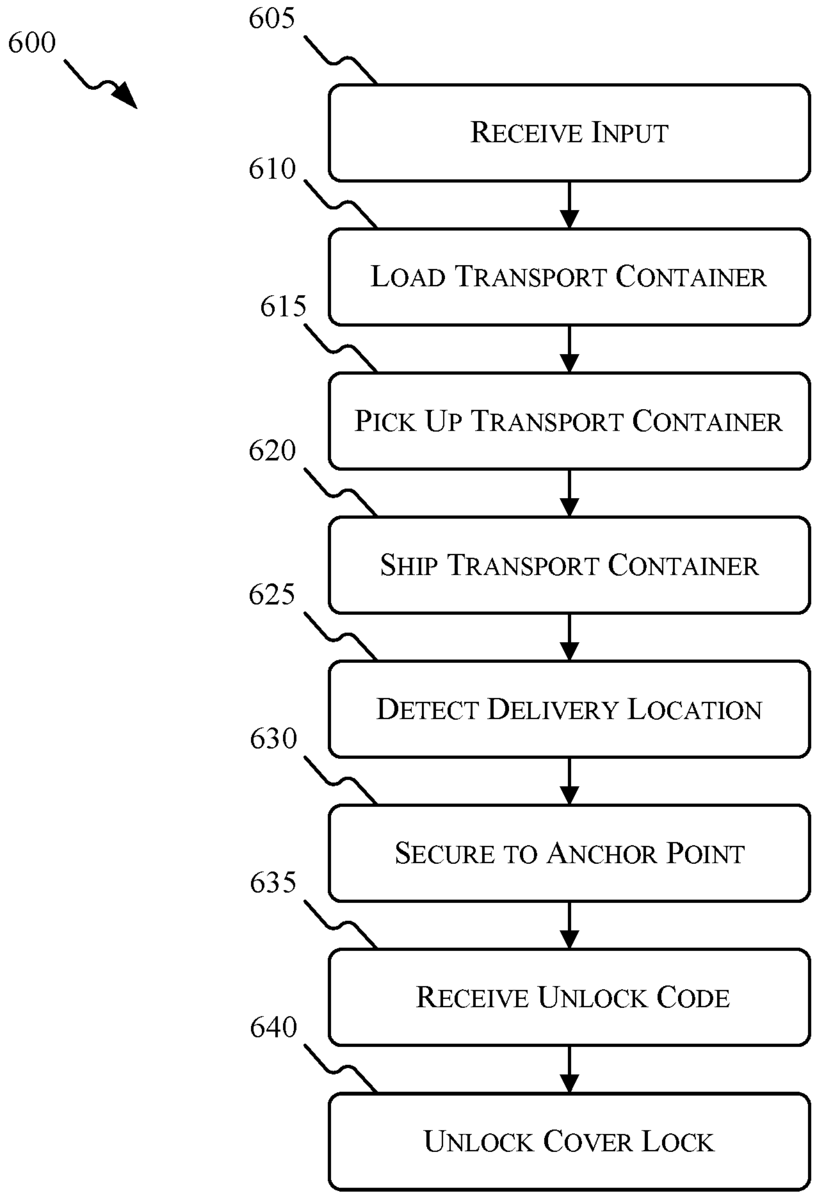
FIG. 6 is a flowchart of a method of transporting the transport container of FIG. 1, in accordance with some embodiments.

FIG. 6 illustrates an exemplary method 600 of transporting the transport container 100. In the example illustrated, the method 600 includes the electronic controller 130 receiving an input (at block 605). In some embodiments, the input includes, for example, destination information (for example, a recipient's address), pick-up information (for example, a sender's address), sender information (for example, the sender's name or customer number), recipient information (for example, the recipient's name or customer number), an expected delivery timeframe, package content restrictions (for example, temperature or humidity limits), or any combination thereof.

At block 610, the transport container 100 is loaded. For example, the package 170 is place within the cavity 165 of the transport container 100 and the cover 110 is adjusted from the open position to the closed position. In addition, the electronic controller 130 adjusts the cover lock 115 from the unlocked state to the locked state.

At block 615, the transport container 100 is picked up. For example, a delivery person (or an autonomous delivery robot) arrives at the location of the sender and retrieves the transport container 100. In some embodiments, the transport container 100 is securely attached to an anchor point located near the sender. In some such embodiments, the electronic controller 130 releases the transport container 100 from the anchor point in response to receiving an authorization code from a delivery person via, for example, the transceiver 405 of the user interface 410.

At block 620, the transport container 100 is moved to its delivery destination. In some embodiments, the transport container 100 is moved via delivery vehicles (manned or autonomous), sorting facilities, or a combination thereof. While being transported, the transport container 100 measure monitors various conditions using the plurality of sensors 420. Periodically, or by request, the electronic controller 130 may transmit data collected by the plurality of sensors 420.

While in transit, the delivery destination of the transport container 100 can change. In some embodiments, the electronic controller 130 receives a new (or updated) input that indicates a new delivery destination for the transport container 100. For example, the electronic controller 130 may receive a new input indicating that the delivery destination of the transport container 100 should be changed from the recipient's residence to the recipient's office. In some embodiments, the delivery destination of the transport container 100 dynamically changes. For example, the transport container 100 may be configured to follow a mobile device carried by the recipient and deliver the transport container 100 to an anchor point that is located the closest to the recipient's mobile device.

Returning to FIG. 6, at block 625, the electronic controller 130 determines that the transport container 100 has arrived at its delivery location. In some embodiments, the electronic controller 130 makes this determination based on the location of the transport container 100. For example, the electronic controller 130 determines when the current location of the transport container 100 is with a set proximity of the location of a target anchor delivery point.

At block 630, the electronic controller 130 securely attaches the transport container 100 to the anchor delivery point. For example, the electronic controller 130 changes the first locking bar 120 from the unlocked state to the locked state. In some embodiments, the electronic controller 130 transmits a signal to the recipient, via the transceiver 405, indicating that the transport container 100 has arrived.

At block 635, the electronic controller 130 receives an unlock code, for example, from the recipient of the transport container 100. In some embodiments, the electronic controller 130 receives the unlock code via the user interface 410. For example, the recipient enters the unlock code into a keypad included in the user interface 410. In alternate embodiments, the electronic controller 130 receives the unlock code via the transceiver 405. For example, the transceiver 405 receives the unlock code in a wireless signal sent by a mobile device of the recipient.

Upon receiving the unlock code, the electronic controller 130 adjusts the cover lock 115 from the locked state to the unlocked state (at block 640). With the cover lock 115 in the unlocked state, the recipient can adjust the cover 110 to the open state (i.e., open the cover 110) and retrieve the package 170.

The transport containers 100 and 500 described herein are reusable. Thus, in some embodiments, the method 600 returns to block 605 after block 640 and the transport container 100 receives a new input to transport a new package. For example, after retrieving the package 170, the recipient can use the transport container 100 to transport a different package to a different delivery location. In some embodiments, after the package 170 has been retrieved, the transport container 100 transmits a signal to the shipping company requesting a retrieval of the transport container 100. For example, the shipping company picks up the transport container 100 and sends it to a local storage facility after the recipient has retrieved the package 170.

The transport container 100 includes a unique identifier (for example, a unique code) that is used to distinguish the transport container 100 from a different transport container. In some embodiments, the unique identifier for the transport container 100 is electronically readable. For example, the unique identifier is stored in the memory 430 of the electronic controller 130. As a further example, the unique identifier is stored in an electronically readable tag included in the transport container 100 such as a radio frequency identification (RFID) tag or a near-field communication (NFC) tag. Alternatively or in addition, the unique identifier is optically readable on the transport container 100. For example, the unique identifier is a barcode (or QR code) image attached to an outer surface of the body 105 or displayed by a touch-screen display included in the user interface 410.

The unique identifier eliminates the need to place a new physical label on the transport container 100 for each subsequent delivery of the transport container 100. Rather, the input for each delivery (for example, destination information, pick-up information, etc.) is associated with the unique identifier of the transport container 100.

This disclosure is not limited in its application to the examples provided, the embodiments discussed, or to the details of construction and the arrangement of components set forth in the foregoing description or drawings. The disclosure is capable of other embodiments and of being practiced or of being carried out in various ways.

What is claimed is:

1. An apparatus comprising a controller configured to:

receive confirmation of attachment of a first locking bar of a transport container to a first anchor point of a structure, the first locking bar transitioning from a first unlocked state to a first locked state during attachment;

confirm a locking of the first locking bar to the first anchor point; and in response to confirming the locking, enable a release of a second locking bar of the transport container from a second anchor point, wherein enabling the release includes adjusting the second locking bar from a second locked state to a second unlocked state.

2. The apparatus of claim 1, wherein the controller is further configured to adjust a lock of the transport container between a first state and a second state, wherein the lock is configured to, in the first state, secure a cover over an opening of a container body or couple an end of a membrane to a container base.

3. The apparatus of claim 2, wherein the lock is further configured to, in the second state, enable movement of the cover relative to the opening.

4. The apparatus of claim 1, wherein the structure comprises a portion of a vehicle.

5. The apparatus of claim 4, wherein the vehicle comprises an autonomous vehicle.

6. The apparatus of claim 4, wherein the controller is further configured to adjust the first locking bar from the first unlocked state to the first locked state in response to receiving a code from the vehicle.

7. The apparatus of claim 4, wherein the controller is configured to initiate transmission of a first signal to the vehicle, the first signal instructing the vehicle to move to a particular position, wherein moving the vehicle to the particular position enables the first locking bar to transition from the first unlocked state to the first locked state.

8. The apparatus of claim 1, wherein the second locking bar comprises a magnetic locking mechanism.

9. The apparatus of claim 1, wherein the first locking bar comprises a magnetic locking mechanism.

10. The apparatus of claim 1, the apparatus further comprising:

a cover moveable from a closed state covering an opening of the transport container to an open state; and a cover lock adjustable from a third unlocked state to a third locked state in which the cover is held in the closed state, wherein the cover lock is configured to enable movement of the cover relative to the opening, and wherein the controller is further configured to initiate adjustment of one or both of the cover lock and the first locking bar.

11. The apparatus of claim 1, the apparatus further comprising an environmental sensor coupled to the controller and disposed at least partially within a cavity of the transport container, wherein the controller is further configured to determine at least one environmental condition of the cavity via the environmental sensor.

12. The apparatus of claim 1, the apparatus further comprising a transceiver coupled to the controller, wherein the controller is further configured to determine a location of the transport container based on a location signal received via the transceiver.

13. The apparatus of claim 1, the apparatus further comprising a location sensor coupled to the controller, wherein the controller is further configured to determine a location of the transport container via the location sensor.

14. The apparatus of claim 1, the apparatus further comprising a transceiver coupled to the controller, wherein the controller is further configured to transmit a location of the transport container via the transceiver.

15. The apparatus of claim 1, the apparatus further comprising a movement sensor coupled to the controller, wherein the controller is further configured to:

determine a movement of a body of the transport container via the movement sensor; and initiate transmission of an alert signal in response to determining that the movement is greater than a threshold value.

16. The apparatus of claim 1, wherein the controller is further configured to confirm the locking based on determining that a detected amount of movement of a body of the transport container is less than a threshold value.

17. The apparatus of claim 1, the apparatus further comprising a transceiver coupled to the controller, wherein the controller is further configured to confirm the locking based on a signal received via the transceiver.

18. A non-transitory computer-readable medium storing instructions that, when executed by a processor, cause the processor to:

receive confirmation of attachment of a first locking bar of a transport container to a first anchor point of a structure, the first locking bar transitioning from a first unlocked state to a first locked state during attachment;

confirm a locking of the first locking bar to the first anchor point; and in response to confirming the locking, enable a release of a second locking bar of the transport container from a second anchor point, wherein enabling the release includes adjusting the second locking bar from a second locked state to a second unlocked state.

19. A method comprising:

receiving confirmation of attachment of a first locking bar of a transport container to a first anchor point of a structure, the first locking bar transitioning from a first unlocked state to a first locked state during attachment;

confirming a locking of the first locking bar to the first anchor point; and in response to confirming the locking, enabling a release of a second locking bar of the transport container from a second anchor point, wherein enabling the release includes adjusting the second locking bar from a second locked state to a second unlocked state.

20. The method of claim 19, wherein the structure comprises a portion of a vehicle.

* * * * *